United States Patent
Yang et al.

(10) Patent No.: US 10,983,975 B2
(45) Date of Patent: Apr. 20, 2021

(54) DATA BLOCK STORAGE METHOD AND APPARATUS, AND ELECTRONIC DEVICE

(71) Applicant: Ant Financial (Hang Zhou) Network Technology Co., Ltd., Hangzhou (CN)

(72) Inventors: Zhenkun Yang, Hangzhou (CN); Yuzhong Zhao, Hangzhou (CN)

(73) Assignee: ANT FINANCIAL (HANG ZHOU) NETWORK TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 16/884,497

(22) Filed: May 27, 2020

(65) Prior Publication Data

US 2020/0285399 A1    Sep. 10, 2020

Related U.S. Application Data

(63) Continuation of application No. PCT/CN2020/071130, filed on Jan. 9, 2020.

(30) Foreign Application Priority Data

Jun. 13, 2019  (CN) .......................... 201910511095.6

(51) Int. Cl.
 *G06F 16/22*    (2019.01)
(52) U.S. Cl.
 CPC .............. *G06F 16/2246* (2019.01)
(58) Field of Classification Search
 CPC ................................................. G06F 16/2246
 See application file for complete search history.

(56) References Cited

U.S. PATENT DOCUMENTS

| 9,660,666 B1 | 5/2017 | Ciarlini et al. |
| 2012/0221540 A1 | 8/2012 | Rose et al. |

(Continued)

FOREIGN PATENT DOCUMENTS

| CN | 101142958 A | 11/2014 |
| CN | 105159915 A | 12/2015 |

(Continued)

OTHER PUBLICATIONS

First Search dated Apr. 3, 2020, issued in related Chinese Application No. 201910511095.6 (2 pages).

(Continued)

*Primary Examiner* — Irete F Ehichioya
*Assistant Examiner* — Xiaoqin Hu

(57) ABSTRACT

Embodiments provide a data block storage method applied to a database employing an LSM tree. According to the method, data in the $0^{th}$ layer of the LSM tree is organized in MacroBlocks. When the data in the LSM tree is transferred from an upper layer to a lower layer, the data is transferred to the lower layer in the form of MacroBlocks, so that all layers of the LSM tree are organized in the form of MacroBlocks. When inter-layer data merger is performed, the merger may be performed based on the MacroBlocks, which can avoid rewriting of all data on an entire layer and can effectively reduce disk IO and temporary space consumption. Moreover, as each MacroBlock comprises a plurality of variable-length MicroBlocks, the data may be stored in a storage space in a more compact manner.

17 Claims, 3 Drawing Sheets

(56) References Cited

U.S. PATENT DOCUMENTS

| | | |
|---|---|---|
| 2014/0074853 A1 | 3/2014 | Nath |
| 2014/0279855 A1 | 9/2014 | Tan et al. |
| 2015/0058568 A1 | 2/2015 | Fong et al. |
| 2016/0306810 A1 | 10/2016 | Ni |
| 2017/0109399 A1 | 4/2017 | Steam et al. |
| 2017/0177657 A1 | 6/2017 | Wilding |
| 2017/0249257 A1 | 8/2017 | Bonnet et al. |
| 2017/0344290 A1 | 11/2017 | Horowitz |
| 2018/0089244 A1 | 3/2018 | Velayudhan Pillai et al. |
| 2018/0130040 A1 | 5/2018 | Nuzum et al. |
| 2018/0225321 A1 | 8/2018 | Boles et al. |
| 2018/0225322 A1* | 8/2018 | Boles .................. G06F 16/9027 |
| 2018/0300350 A1 | 10/2018 | Mainali et al. |
| 2020/0183906 A1* | 6/2020 | Spillane .............. G06F 16/2219 |

FOREIGN PATENT DOCUMENTS

| | | |
|---|---|---|
| CN | 105447035 A | 3/2016 |
| CN | 105447059 A | 3/2016 |
| CN | 106599247 A | 4/2017 |
| CN | 106682184 A | 5/2017 |
| CN | 106708427 A | 5/2017 |
| CN | 107038206 A | 8/2017 |
| CN | 107436738 A | 12/2017 |
| CN | 108090372 A | 5/2018 |
| CN | 108733306 A | 11/2018 |

OTHER PUBLICATIONS

First Office Action dated Apr. 10, 2020, issued in related Chinese Application No. 201910511095.6, with English machine translation (16 pages).

Second Office Action dated May 12, 2020, issued in related Chinese Application No. 201910511095.6, with English machine translation (7 pages).

Supplemental Search dated May 27, 2020, issued in related Chinese Application No. 201910511095.6, (1 page).

* cited by examiner

DATA BLOCK STORAGE METHOD AND APPARATUS, AND ELECTRONIC DEVICE

CROSS REFERENCE TO RELATED APPLICATIONS

This application is a continuation application of International Application No. PCT/CN2020/071130, filed on Jan. 9, 2020, which claims priority to and benefits of Chinese Patent Application No. 201910511095.6 filed on Jun. 13, 2019. The contents of the above-referenced applications are incorporated herein by reference in their entirety.

TECHNICAL FIELD

Embodiments of the specification relate to the field of electronic technologies, and in particular, to a data block storage method and apparatus and an electronic device.

BACKGROUND

Log Structured Merge Tree (LSM Tree) is a hard disk-based data structure, which can significantly reduce the overhead of a disk arm of a hard disk, and can provide high-speed insertion and deletion of files for a relatively long period of time. However, the LSM Tree does not have good performance in some cases, in particular when a rapid response is required for a query. In an existing LSM Tree-based storage engine, the LSM Tree is a multi-layer data structure. Data in each layer is organized in files. When inter-layer data merger is performed, all files on a lower layer need to be rewritten.

SUMMARY

Embodiments of the specification provide a data block storage method and apparatus and an electronic device.

According to a first aspect, the embodiments of the specification provide a data block storage method applied to a database employing an LSM tree. The LSM tree adopts an N-layer data structure, the storage space of an $i^{th}$ layer is smaller than the storage space of an $(i+1)^{th}$ layer, i being an integer from 0 to N−1. The method includes: writing to fill up a plurality of MacroBlocks in the $0^{th}$ layer of the LSM tree through the following steps: obtaining M pieces of ordered data in a memory according to a data sequence, and compressing the M pieces of ordered data to obtain a MicroBlock, M being an integer greater than 0; and appending the MicroBlock to a current MacroBlock in the $0^{th}$ layer until the size of the current MacroBlock reaches a preset value, and writing a MicroBlock formed next into a next MacroBlock.

According to a second aspect, the embodiments of the specification provide a data block storage apparatus applied to a database employing an LSM tree. The LSM tree adopts an N-layer data structure, the storage space of an $i^{th}$ layer is smaller than the storage space of an $(i+1)^{th}$ layer, i being an integer from 0 to N−1. The apparatus comprises a compressing unit and a storing unit: the following steps are executed by the compressing unit and the storing unit, respectively, to write to fill up a plurality of MacroBlocks in the $0^{th}$ layer of the LSM tree: the compressing unit obtains M pieces of ordered data in a memory according to a data sequence, and compresses the M pieces of ordered data to obtain a MicroBlock, M being an integer greater than 0; and the storing unit appends the MicroBlock to a current MacroBlock in the $0^{th}$ layer until the size of the current MacroBlock reaches a preset value, and writes a MicroBlock formed next into a next MacroBlock.

According to a third aspect, the embodiments of the specification provide an electronic device, comprising: a memory; one or more processors. The data block storage apparatus in the second aspect is stored in the memory and executable by the one or more processors.

According to a fourth aspect, the embodiments of the specification provide a computer readable storage medium storing a computer program, wherein the program implements, when executed by a processor, steps of the data block storage method in the first aspect.

According to a fifth aspect, the embodiments of the specification provide a data block storage method applied to a database employing a LSM tree. The LSM tree includes a data structure having N layers, and a storage space of an $i^{th}$ layer is less than a storage space of an $(i+1)^{th}$ layer, i being an integer from 0 to N−1. The method includes: obtaining M pieces of ordered data from a memory according to a data sequence, M being an integer greater than 0; compressing the M pieces of ordered data to obtain one MicroBlock; iterating the obtaining and the compressing to generate a plurality of MicroBlocks; sequentially writing the MicroBlocks to a current MacroBlock in the $0^{th}$ layer of the LSM tree until a size of the current MacroBlock reaches a preset value; after the size of the current MacroBlock reaches the preset value, writing a next MicroBlock into a next MacroBlock until the $0^{th}$ layer is filled up with a plurality of MacroBlocks; determining a to-be-merged $j^{th}$ layer in the LSM tree, j being an integer from 0 to N−1; merging MacroBlocks in the $j^{th}$ layer to the $(j+1)^{th}$ layer, wherein the merging does not cause all MacroBlocks in the $(j+1)^{th}$ layer to be rewritten; and emptying the $j^{th}$ layer, the emptied $j^{th}$ layer being used for storing a MacroBlock transferred from the $(j-1)^{th}$ layer.

In some embodiments, the determining a to-be-merged $j^{th}$ layer in the LSM tree includes: determining a layer in the LSM tree with a remaining storage space insufficient of storing to-be-stored data as the $j^{th}$ layer.

In some embodiments, the to-be-stored data is a to-be-written MicroBlock received at the $0^{th}$ layer. The method further includes: if the remaining storage space of the $0^{th}$ layer is less than a size of one MacroBlock, determining that the $0^{th}$ layer is unable to store the to-be-written MicroBlock.

In some embodiments, the to-be-stored data is a MacroBlock from a layer immediately above the $j^{th}$ layer in the LSM tree.

In some embodiments, the determining a to-be-merged $j^{th}$ layer in the LSM tree includes: determining a layer in the LSM tree with a remaining storage space less than a preset capacity as the $j^{th}$ layer.

In some embodiments, a MacroBlock includes one or more key-value pairs. The merging MacroBlocks in the $j^{th}$ layer to the $(j+1)^{th}$ layer includes: determining whether a first MacroBlock in the $j^{th}$ layer and MacroBlocks in the $(j+1)^{th}$ layer have one or more same keys; in response to determining that the first MacroBlock in the $j^{th}$ layer and the MacroBlocks in the $(j+1)^{th}$ layer have no same keys, directly transferring the first MacroBlock to the $(j+1)^{th}$ layer; in response to determining that the first MacroBlock in the $j^{th}$ layer and a second MacroBlock in the $(j+1)^{th}$ layer have one or more same keys, updating one or more values corresponding to the one or more same keys in the second MacroBlock to be one or more values corresponding to the one or more same keys in the first MacroBlock to obtain an updated second MacroBlock; generating an updated first MacroBlock by removing one or more key-value pairs corresponding to the one or more same keys; and sequentially storing the updated first MacroBlock and the updated second MacroBlock to the $(j+1)^{th}$ layer.

In some embodiments, a size of each MacroBlock stored in the N layers of the LSM tree is a preset fixed value.

According to a sixth aspect, the embodiments of the specification provide an apparatus. The apparatus includes one or more processors and a memory storing instructions executable by the one or more processors to cause the one or more processors to perform operations including: obtaining M pieces of ordered data from a memory according to a data sequence, M being an integer greater than 0; compressing the M pieces of ordered data to obtain one MicroBlock; iterating the obtaining and the compressing to generate a plurality of MicroBlocks; sequentially writing the MicroBlocks to a current MacroBlock in the $0^{th}$ layer of the LSM tree until a size of the current MacroBlock reaches a preset value, wherein the LSM tree includes a data structure having N layers, and a storage space of an $i^{th}$ layer is less than a storage space of an $(i+1)^{th}$ layer, i being an integer from 0 to N−1; after the size of the current MacroBlock reaches the preset value, writing a next MicroBlock into a next MacroBlock until the $0^{th}$ layer is filled up with a plurality of MacroBlocks; determining a to-be-merged $j^{th}$ layer in the LSM tree, j being an integer from 0 to N−1; merging MacroBlocks in the $j^{th}$ layer to the $(j+1)^{th}$ layer, wherein the merging does not cause all MacroBlocks in the $(j+1)^{th}$ layer to be rewritten; and emptying the $j^{th}$ layer, the emptied $j^{th}$ layer being used for storing a MacroBlock transferred from the $(j−1)^{th}$ layer.

According to a seventh aspect, the embodiments of the specification provide one or more non-transitory computer-readable storage media configured with instructions executable by one or more processors to cause the one or more processors to perform operations including: obtaining M pieces of ordered data from a memory according to a data sequence, M being an integer greater than 0; compressing the M pieces of ordered data to obtain one MicroBlock; iterating the obtaining and the compressing to generate a plurality of MicroBlocks; sequentially writing the MicroBlocks to a current MacroBlock in the $0^{th}$ layer of the LSM tree until a size of the current MacroBlock reaches a preset value, wherein the LSM tree includes a data structure having N layers, and a storage space of an $i^{th}$ layer is less than a storage space of an $(i+1)^{th}$ layer, i being an integer from 0 to N−1; after the size of the current MacroBlock reaches the preset value, writing a next MicroBlock into a next MacroBlock until the $0^{th}$ layer is filled up with a plurality of MacroBlocks; determining a to-be-merged $j^{th}$ layer in the LSM tree, j being an integer from 0 to N−1; merging MacroBlocks in the $j^{th}$ layer to the $(j+1)^{th}$ layer, wherein the merging does not cause all MacroBlocks in the $(j+1)^{th}$ layer to be rewritten; and emptying the $j^{th}$ layer, the emptied $j^{th}$ layer being used for storing a MacroBlock transferred from the $(j−1)^{th}$ layer.

The embodiments of the specification achieve the at least following advantageous effects: the data block storage method provided by the embodiments of the specification is applied to a database employing an LSM tree, wherein the LSM tree adopts an N-layer data structure, the storage space of an $i^{th}$ layer is smaller than the storage space of an $(i+1)^{th}$ layer, and the following steps are executed to write to fill up a plurality of MacroBlocks in the $0^{th}$ layer of the LSM tree: obtaining M pieces of ordered data in a memory according to a data sequence, compressing the M pieces of ordered data to obtain a MicroBlock, writing the MicroBlock to a current MacroBlock in the $0^{th}$ layer until the size of the current MacroBlock reaches a preset value, and writing a MicroBlock formed next into a next MacroBlock. In this way, the data in the $0^{th}$ layer of the LSM tree is organized in MacroBlocks. When the data in the LSM tree is transferred from an upper layer to a lower layer, the data is transferred to the lower layer in the form of MacroBlocks, so that all layers of the LSM tree are organized in the form of MacroBlocks. Then, when inter-layer data merger is performed, the merge may be performed on the MacroBlocks, which can avoid the rewrite of all data on an entire layer and can effectively reduce disk IO and temporary space consumption. Moreover, as each MacroBlock comprises a plurality of variable-length MicroBlocks, the data may be stored in a storage space in a more compact manner, which leads to little waste of spaces and can make full use of the storage space on each layer.

DETAILED DESCRIPTION OF EMBODIMENTS

To better understand the above-described technical solutions, the technical solutions of the embodiments of the specification will be described in detail below with reference to the accompanying drawings and exemplary embodiments. It should be understood that the embodiments of the specification and exemplary features of the embodiments are to describe the technical solutions of the embodiments of the specification in detail, which do not limit the technical solutions of the specification. In the case of no conflict, the embodiments of the specification and technical features of the embodiments may be combined with each other.

To better describe the embodiments of the specification, several terms will be explained first as follows:

MicroBlock: a storage block formed by several pieces of data with a variable length that may have a suggested value of 16 KB. An actual storage length possibly shorter or longer than 16 KB, which is a basic unit for reading data.

MacroBlock: a storage block formed by several MicroBlocks with a fixed length that may have a suggested value of 2 MB, which is a basic unit for writing data.

Log Structured Merge Tree (LSM Tree): a multi-layer data structure, wherein data in each layer is ordered, but different layers may have overlapping data. During data write operations, data is written only into the latest layer, and data in all layers may need to be merged during search.

Figure 1:
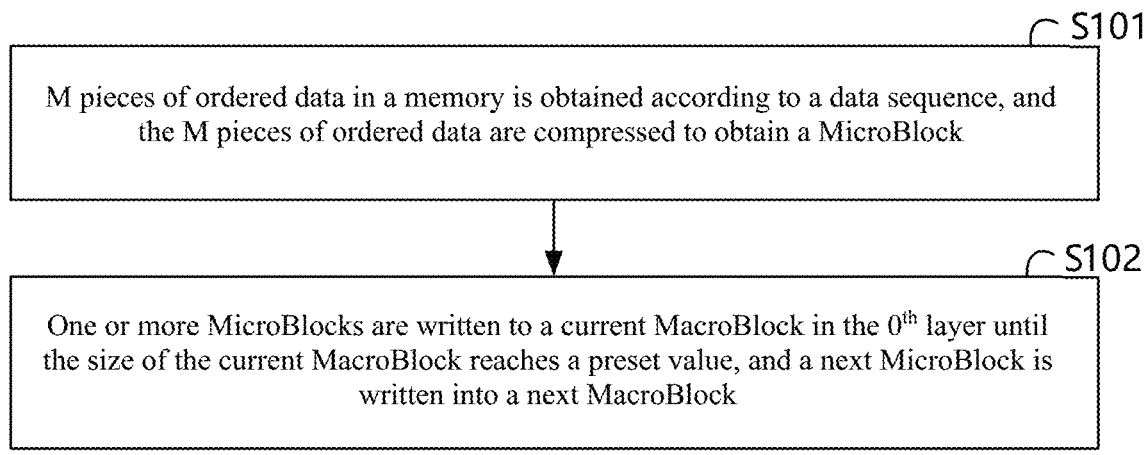
FIG. 1 is a flow chart of a data block storage method according to some embodiments of the specification.

According to a first aspect, the embodiments of the specification provide a data block storage method applied to a database employing an LSM tree, wherein the LSM tree adopts an N-layer data structure, the storage space of an $i^{th}$ layer is smaller than the storage space of an $(i+1)^{th}$ layer, i being an integer from 0 to N−1. The method includes:

referring to FIG. 1, writing to fill up a plurality of Macro-Blocks in the $0^{th}$ layer of the LSM tree through the following steps.

In S101, M pieces of ordered data in a memory is obtained according to a data sequence, and the M pieces of ordered data are compressed to obtain a MicroBlock, M being an integer greater than 0. These operations may be iterated to generate a plurality of MicroBlocks until the data in the memory for storage is exhausted.

In S102, the MicroBlocks is written to a current Macro-Block in the $0^{th}$ layer until the size of the current MacroBlock reaches a preset value, and a next MicroBlock is written into a next MacroBlock.

The data block storage method in some embodiments is applied to a database employing LSM. In the database employing LSM, a persistence storage space uses an LSM tree structure, data is placed in layers, and the data is initially written into a memory space in the storage system. For example, data of a key-value structure is written into a memory space in a log manner. For example, data needs to be written into a memory space in an order of data key values from low to high, and is then gradually written into a persistence storage space on other layers from up down, such as a Hard Disk Drive (HDD) or a Solid State Drive (SSD).

In one example, a region may be allocated in advance in the memory or a storage table may be created for storing data to be placed into an LSM tree later. When there is data to be stored into the LSM tree, the data may be stored in the memory first. When the memory is full of data, all the data is stored into the $0^{th}$ layer of the LSM tree. The LSM tree may be of a shape similar to a pyramid, including a total of N layers, namely, the $0^{th}$ layer, the $1^{st}$ layer, the $2^{nd}$ layer, . . . , and the $(N-1)^{th}$ layer. The storage space of an $i^{th}$ layer is smaller than the storage space of an $(i+1)^{th}$ layer, namely, lower layers have larger storage spaces than upper layers do. For example, the storage space of the $2^{nd}$ layer is larger than the storage space of the $1^{st}$ layer, and the storage space of the $1^{st}$ layer is larger than the storage space of the $0^{th}$ layer. The following order of storage may be followed: first storing data in the $0^{th}$ layer, when the $0^{th}$ layer is full, writing, together with data in the $0^{th}$ layer, into the $1^{st}$ layer, and so on, thereby realizing the writing of data into the LSM tree and continuous movement of data from a storage space of an upper layer to a storage space of a lower layer.

In a storage system of an existing LSM tree, to empty a storage space for newly written data, a data merger operation may be often executed. In a storage engine based on an LSM tree, such as HBase, RocksDB, and the like, data in each layer is organized in files. Assuming that the file size of the $1^{st}$ layer is 1 GB and the file size of the $2^{nd}$ layer is 10 GB, then in a process of merging data in the $1^{st}$ layer and the $2^{nd}$ layer by HBase and RocksDB, all the data in the $1^{st}$ layer (1 GB of data) and the $2^{nd}$ layer (10 GB of data) are written into the memory, the overlapping data (values) having the same key is updated in the memory, and then the data is sorted again. In this way, all the data in the $2^{nd}$ layer needs to be rewritten. As a result, an extra memory space of 11 GB is required, and 11 GB of read and write IO is consumed.

Moreover, in a conventional database, such as Oracle, MySQL, and the like, the read and write sizes of a data block are both of a fixed length, which is usually 8 KB or 16 KB. A fixed-length data block facilitates storage management, but does not favor data compression. Assuming that the size of one data block is 16 KB, the size becomes 9 KB after compression through some compression algorithms, but a space of 16 KB is still required for storage. About 50% of the space is wasted. At the same time, in a persistence process, a fixed-length data block of Oracle/MySQL requires random write to a disk, which is not friendly to both SSD disks and mechanical disks. The performance of random write of small blocks is far inferior to the performance of continuous write of large blocks.

Figure 2:
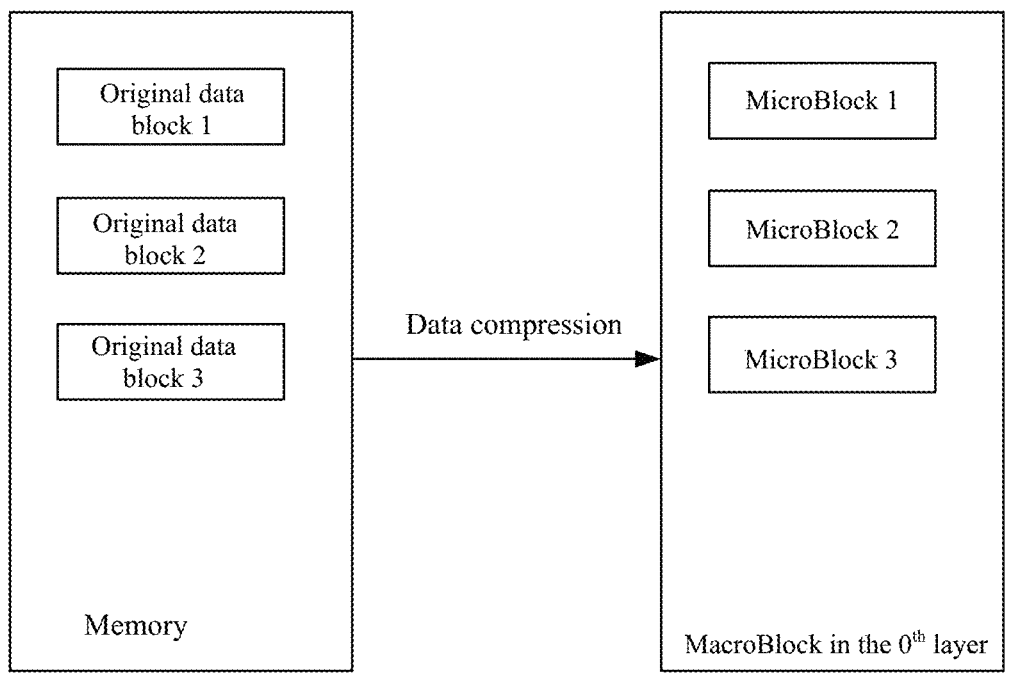
FIG. 2 is a schematic diagram of constructing a MacroBlock in a data block storage method according to some embodiments of the specification.

Referring to FIG. 2, FIG. 2 illustrates a process of constructing MicroBlocks and MacroBlocks for the $0^{th}$ layer. According to some embodiments, first, M pieces of ordered data are used to form an original data block, which is compressed using a preset compression algorithm. The compressed original data block is a MicroBlock. Since M pieces of data are obtained each time, the formed original data blocks are of a fixed same size. The compression effect is different for different data types, and therefore the MicroBlocks are of different sizes. As a result, the length of the MicroBlocks is not fixed. Then, the formed MicroBlocks are written into a MacroBlock in a data sequence of ascending key values, until the MacroBlock does not have space to hold more MicroBlocks. In an exemplary implementation process, M may be set as needed, which is not limited in the embodiments of the specification. The suggested parameters are that the MacroBlock length is 2 MB and the MicroBlock length is around 16 KB. In the worst-case scenario, the MacroBlock size is 2 M-16 KB, which is short of 2 M by 16 KB, while a MicroBlock to be written has a length that is only slightly greater than 16 KB. As a result, this MicroBlock cannot be written, and about less than 0.8%, i.e., 16 KB/2 MB, of the space will be wasted. In an exemplary implementation process, the preset compression algorithm may be differential encoding, RLE, Huffman encoding, LZW encoding, LZ compression, and the like, which may be set as needed and is not limited in the embodiments of the specification.

Compared with the fixed-length data blocks of a conventional database, such as Oracle/MySQL, the MicroBlocks have a variable length in some embodiments of the specification, and can be stored in a MacroBlock in a more compact manner, which has little waste of spaces and can save 50% of the storage space compared with databases such as Oracle and the like. At the same time, the size of data that is read each time is still around 16 KB, and the read performance is not affected.

For example, when writing data, the data is first written into a memory. Data in the memory is still written in an order. When the memory space is insufficient, the data in the memory needs to be transferred to a persistence space, namely: the data in the memory is stored in the form of MicroBlocks to a MacroBlock in the $0^{th}$ layer, until the size of a formed MacroBlock reaches a preset value. For example, the size of a MacroBlock is a fixed value of 2 M, and then the preset value is 2 M, which may also be set to be slightly smaller than 2 M, e.g., 2 M-16 K and the like. Then, the next MacroBlock is opened up, waiting for storing MicroBlocks transferred from the memory. A MicroBlock formed next is written into the next MacroBlock to form a new MacroBlock, and so on, until the remaining storage space in the $0^{th}$ layer is smaller than the MacroBlock length. Then, the MacroBlock of the $0^{th}$ layer is transferred to the $1^{st}$ layer. After the $1^{st}$ layer is full, data may be stored into the $2^{nd}$ layer, and so on, thereby realizing the establishment of the LSM tree. A plurality of MacroBlocks are stored in each layer of the LSM tree, data in the storage space of each layer is organized in MacroBlocks, and a plurality of ordered MicroBlocks exist in each MacroBlock. Data stored in the form of variable-length MicroBlocks in a MacroBlock of each layer may be stored in the form of MacroBlocks in a more compact manner, which reduces the waste of spaces. For a persistence storage space, the write unit is the size of MacroBlock, and the read unit is the size of MicroBlock.

In a process of storing data into a storage space of each layer of the LSM tree, inter-layer data merger is continuously performed so as to store new data. For example, a to-be-merged $j^{th}$ layer is determined first, which may be realized through the following steps.

First manner: a layer in the LSM tree with a remaining storage space insufficient of storing to-be-stored data is used as the $j^{th}$ layer.

For example, in some embodiments, a layer that cannot store to-be-stored data is used as the $j^{th}$ layer in need of data merger. There may be two cases of to-be-stored data as follows.

First case: the to-be-stored data is a to-be-written MicroBlock received by the $0^{th}$ layer. If the remaining storage space of the $0^{th}$ layer is smaller than the size of one MacroBlock, it indicates that the $0^{th}$ layer is unable to store the to-be-written MicroBlock, and the $j^{th}$ layer is the $0^{th}$ layer.

For example, in some embodiments, the $0^{th}$ layer receives a MicroBlock transferred from the memory, and the MicroBlock is obtained by sequentially compressing a plurality of pieces of ordered data in the memory with a preset compression algorithm. Namely, a plurality of pieces of ordered data in the memory are sequentially read, which are compressed with a preset compression algorithm to form a MicroBlock. The MicroBlocks are transferred to a current MacroBlock in the $0^{th}$ layer, until the total size of MicroBlocks contained in the current MacroBlock reaches a preset value, e.g., 2 M, and a next MicroBlock cannot be placed in the current MacroBlock. Then, a new MacroBlock is opened up for storing the next MicroBlock. In this way, a plurality of ordered MacroBlocks are formed in the $0^{th}$ layer, until the remaining storage space in the $0^{th}$ layer is smaller than the size of one MacroBlock. When that happens, the data of the $0^{th}$ layer needs to be merged to the $1^{st}$ layer. Therefore, the $0^{th}$ layer is determined to be the to-be-merged $j^{th}$ layer.

Second case: the to-be-stored data is a MacroBlock in the layer above the current layer in the LSM tree.

For example, in some embodiments, with regard to an intermediate layer of the LSM tree, namely, the $p^{th}$ layer, a plurality of MacroBlocks are also stored in the $(p-1)^{th}$ layer. If the MacroBlocks in the $(p-1)^{th}$ layer are merged to the $p^{th}$ layer, it is determined whether the $p^{th}$ layer can store all the MacroBlocks contained in the $(p-1)^{th}$ layer. If the $p^{th}$ layer cannot store all the MacroBlocks contained in the $(p-1)^{th}$ layer, it is determined that j=p and the $p^{th}$ layer is the to-be-merged $j^{th}$ layer.

Assuming that 1 G of MacroBlocks is stored in the $0^{th}$ layer and the storage space of the $1^{st}$ layer is 10 G, if 5 G of data have already been stored in the $1^{st}$ layer, the MacroBlocks in the $0^{th}$ layer are merged with the MacroBlocks in the $1^{st}$ layer and stored in the $1^{st}$ layer after the 0th layer is filled up with 1 G of data. The merged MacroBlocks are at most 6 G, and the $1^{st}$ layer has a sufficient space for storage. Therefore, the $1^{st}$ layer is not the to-be-merged $j^{th}$ layer. If 9.5 G of data have already been stored in the $1^{st}$ layer, the MacroBlocks in the $0^{th}$ layer are merged with the MacroBlocks in the $1^{st}$ layer and stored in the $1^{st}$ layer after the $0^{th}$ layer is filled up with 1 G of data. The merged MacroBlocks have a size greater than 10 G, and the $1^{st}$ layer does not have a sufficient space for storage. Therefore, the $1^{st}$ layer is the to-be-merged $j^{th}$ layer, and the $1^{st}$ layer needs to be merged with MacroBlocks in the $j^{th}$ layer.

Second manner: a layer in the LSM tree with a remaining storage space smaller than a preset capacity is used as the $j^{th}$ layer.

For example, in some embodiments, the remaining storage space of each layer may be detected at a preset interval. If the remaining storage space of a $k^{th}$ layer is smaller than a preset capacity, j=k, and the $k^{th}$ layer is the to-be-merged $j^{th}$ layer. In an exemplary implementation process, the preset capacity may be set as needed. For the $k^{th}$ layer, the preset capacity may be set to be 10% of the storage space of the $k^{th}$ layer, the size of the storage space of the $(k-1)^{th}$ layer, or 90% of the storage space of the $(k-1)^{th}$ layer. In this way, it can be ensured that, when there is data to be written into the $k^{th}$ layer of the LSM tree, the $k^{th}$ layer has a sufficient storage space for storing the to-be-written data, thereby ensuring the timeliness of data write. Other values may be used as the preset capacity, which is not limited in the embodiments of the specification.

After the to-be-merged $j^{th}$ layer is determined, MacroBlocks in the $j^{th}$ layer are merged to the $(j+1)^{th}$ layer, and then the $j^{th}$ layer is emptied for storing a MacroBlock merged from the $(j-1)^{th}$ layer. When the MacroBlocks in the $j^{th}$ layer are merged to the $(j+1)^{th}$ layer, the merging does not cause all MacroBlocks in the $(j+1)^{th}$ layer to be rewritten.

The following steps may be used to merge MacroBlocks in the $j^{th}$ layer to the $(j+1)^{th}$ layer: if there is no overlapping data having the same key between a first MacroBlock in the $j^{th}$ layer and MacroBlocks in the $(j+1)^{th}$ layer, directly transferring the first MacroBlock to the $(j+1)^{th}$ layer according to a data sequence; if there is overlapping data having the same key between a second MacroBlock in the $j^{th}$ layer and a third MacroBlock in the $(j+1)^{th}$ layer, updating the content of the data having the same key in the third MacroBlock to the content of the data having the same key in the second MacroBlock, and obtaining an updated third MacroBlock; and forming a new MacroBlock after sequentially arranging the data in the second MacroBlock other than the overlapping data and the data in the updated third MacroBlock, and storing the new MacroBlock to the $(j+1)^{th}$ layer according to the order.

Figure 3:
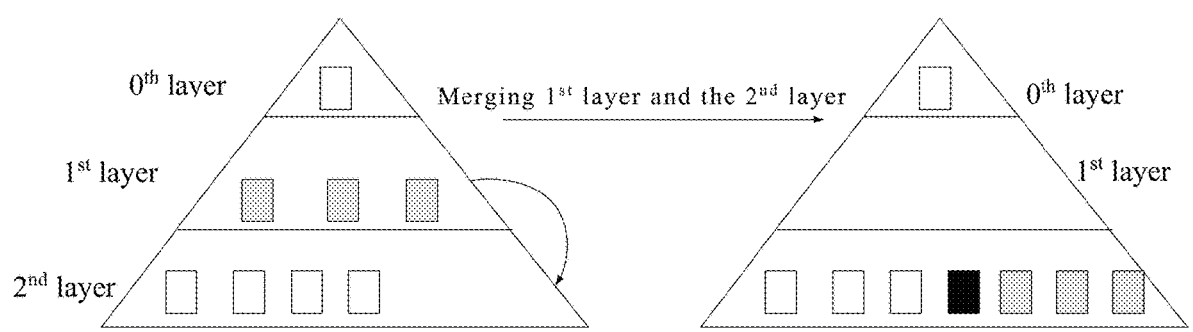
FIG. 3 is a schematic diagram of merging MacroBlocks in a data block storage method according to some embodiments of the specification.

For example, in some embodiments, FIG. 3 illustrates the organizational structure of MacroBlocks and a process of merging MacroBlocks. Each block in the figure represents one MacroBlock, and all data in the MacroBlocks in each layer is ordered and arranged in an order of ascending key values to form an ordered search tree in terms of data structure.

MacroBlocks in the $1^{st}$ layer and the $2^{nd}$ layer are represented by different colors. The MacroBlocks in the $1^{st}$ layer are gray, and the MacroBlocks in the $2^{nd}$ layer are white. When the MacroBlocks in the $1^{st}$ layer and the $2^{nd}$ layer are to be merged, it is found that exactly all the data in the 3 MacroBlocks in the $1^{st}$ layer is larger than the data in the MacroBlocks in the $2^{nd}$ layer, namely, all the minimum keys in the 3 MacroBlocks in the $1^{st}$ layer are larger than all the maximum keys in the MacroBlocks in the $2^{nd}$ layer. Therefore, these 3 MacroBlocks can be directly reused. Other MacroBlocks in the $2^{nd}$ layer have no changes and can also be directly reused only with some intermediate nodes rewritten. The rewritten MacroBlocks are represented by the black color. It can be seen from the figure that more than 80% of the MacroBlocks are directly reused, which reduces 80% of disk IO and temporary space consumption compared with regular merging.

For example, MacroBlocks in the $0^{th}$ layer need to be merged to the $1^{st}$ layer. It is assumed that the $0^{th}$ layer comprises MacroBlock 1 and MacroBlock 2, the $1^{st}$ layer comprises MacroBlock 3, MacroBlock 4 and MacroBlock 5. MacroBlock 1 comprises data with keys of {1, 2, 3, 4, 5}, MacroBlock 2 comprises data with keys of {11, 12, 13, 14, 15}, MacroBlock 3 comprises data with keys of {1, 3, 5, 6, 7}, MacroBlock 4 comprises data with keys of {16, 17, 18, 19, 20}, and MacroBlock 5 comprises data with keys of {21, 22, 23, 24, 25}.

During data merging, MacroBlock 1 in the $0^{th}$ layer and MacroBlock 3 in the $1^{st}$ layer have overlapping data corresponding to keys of 1, 3 and 5. MacroBlock 1 and MacroBlock 3 are read into the memory, subjected to deduplication, and then re-sorted. The sorted data is re-organized into a MacroBlock. Assuming that for the (key, value) pairs in the $0^{th}$ layer, key=1 corresponds to value=a, key=3 corresponds to value=b, and key=5 corresponds to value=c, and in the $1^{st}$ layer, key=1 corresponds to value=e, key=3 corresponds to value=f, and key=5 corresponds to value=g, then the values with keys being 1, 3 and 5 are ultimately updated, after the deduplication, to the values in the $0^{th}$ layer, namely, key=1 corresponds to value=a, key=3 corresponds to value=b, and key=5 corresponds to value=c. Then, the data is re-organized to form MacroBlock 1 comprising data with keys of {1, 2, 3, 4, 5}, MacroBlock 3 comprising data with keys of {6, 7}, MacroBlock 2 comprising data with keys of {11, 12, 13, 14, 15}, MacroBlock 4 comprising data with keys of {16, 17, 18, 19, 20}, and MacroBlock 5 comprising data with keys of {21, 22, 23, 24, 25}, which are sequentially stored into the $1^{st}$ layer.

From the above example, it can be seen that, since all layers are organized in MacroBlocks, many MacroBlocks without overlapping data may be directly reused during merger. For example, MacroBlock 2, MacroBlock 4 and MacroBlock 5 in this example are directly transferred to the $(j+1)^{th}$ layer. Only MacroBlocks with overlapping data (such as MacroBlock 1 and MacroBlock 3 in this example) need to be deduplicated, arranged and organized into MacroBlocks that are stored in a data sequence into the $(j+1)^{th}$ layer. Therefore, compared with the merging schemes according to the current technologies, the techniques disclosed herein reduce consumption of disk TO resources and temporary memory spaces.

Furthermore, in some embodiments, the size of MacroBlocks may be set to be a fixed length. The fixed-length MacroBlocks facilitate storage space management without causing internal space fragments, which favors the recovery and reuse of disk space. However, in an exemplary implementation process, the length of MacroBlocks is not limited, and variable-length MacroBlocks may also be used, as long as the length of a MacroBlock is greater than the length of a MicroBlock.

Furthermore, in some embodiments, when target data in a database is read, it is first determined whether the target data is stored in the memory. Namely, if a data read request is received, the memory is searched first, as the search of data in the memory is the fastest, to determine if the memory has the requested target data. If the target data is obtained in the memory, the LSM tree does not need to be searched. If no target data is read in the memory, the LSM tree is then searched layer by layer from the $0^{th}$ layer.

When searching the LSM tree, the search may start with the $0^{th}$ layer to determine whether the LSM tree has the requested data in a layer by layer search manner. For example, according to a key of the target data, a MacroBlock to which this key belongs may be located, and then the value corresponding to the key of the target data is read from this MacroBlock. Since the search is performed from top down, data stored in an upper layer is the latest data even when the upper layer has overlapping data with a lower layer, which ensures that the latest target data can be rapidly read. Moreover, since data in each layer is organized in MacroBlocks and MacroBlocks in each layer are arranged sequentially, a MacroBlock to which a key of the target data belongs can be rapidly located according to the key of the target data, and then the value corresponding to the key is rapidly read from this MacroBlock, which ensures the efficiency of data read.

Figure 4:
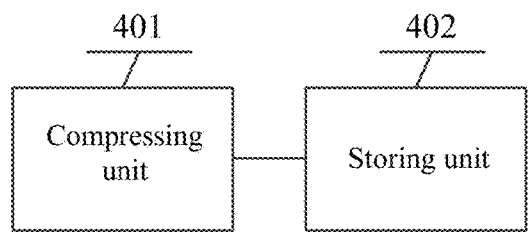
FIG. 4 is a block diagram of a data block storage apparatus according to some embodiments of the specification.

According to a second aspect, based on the same inventive concept, the embodiments of the specification provide a data block storage apparatus applied to a database employing an LSM tree, wherein the LSM tree adopts an N-layer data structure, the storage space of an $i^{th}$ layer is smaller than the storage space of an $(i+1)^{th}$ layer, i being an integer from 0 to N−1. Referring to FIG. 4, the apparatus comprises a compressing unit 401 and a storing unit 402. The following steps are executed by the compressing unit 401 and the storing unit 402, respectively, to write to fill up a plurality of MacroBlocks in the $0^{th}$ layer of the LSM tree.

The compressing unit 401 obtains M pieces of ordered data in a memory according to a data sequence, and compresses the M pieces of ordered data to obtain a MicroBlock, M being an integer greater than 0. The compressing unit 401 may iterate these operations to generate a plurality of MicroBlocks until the data in the memory for storage is exhausted.

The storing unit 402 writes the MicroBlocks to a current MacroBlock in the $0^{th}$ layer until the size of the current MacroBlock reaches a preset value, and writes a next MicroBlock formed next into a next MacroBlock.

In some embodiments, the apparatus further comprises: a determining unit, a merging unit, and an emptying unit.

The determining unit is configured to determine, after writing to fill up a plurality of MacroBlocks in the $0^{th}$ layer of the LSM tree, a to-be-merged $j^{th}$ layer in the LSM tree, j being an integer from 0 to N−1.

The merging unit is configured to merge MacroBlocks in the $j^{th}$ layer to the $(j+1)^{th}$ layer.

The emptying unit is configured to empty the $j^{th}$ layer, the emptied $j^{th}$ layer being used for storing a MacroBlock transferred from the $(j-1)^{th}$ layer.

In some embodiments, the determining unit is configured, for example, to: use a layer in the LSM tree with a remaining storage space insufficient of storing to-be-stored data as the $j^{th}$ layer.

In some embodiments, the to-be-stored data is a to-be-written MicroBlock received by the $0^{th}$ layer, and if the remaining storage space of the $0^{th}$ layer is smaller than the size of one MacroBlock, it is indicated that the $0^{th}$ layer is unable to store the to-be-written MicroBlock; or the to-be-stored data is a MacroBlock in the layer above the current layer in the LSM tree.

In some embodiments, the determining unit is configured, for example, to: use a layer in the LSM tree with a remaining storage space smaller than a preset capacity as the $j^{th}$ layer.

In some embodiments, the merging unit is configured, for example, to: if there is no overlapping data having the same key between a first MacroBlock in the $j^{th}$ layer and MacroBlocks in the $(j+1)^{th}$ layer, directly transfer the first MacroBlock to the $(j+1)^{th}$ layer according to a data sequence; if there is overlapping data having the same key between a second MacroBlock in the $j^{th}$ layer and a third MacroBlock in the $(j+1)^{th}$ layer, update the content of the data having the same key in the third MacroBlock to the content of the data having the same key in the second MacroBlock, and obtain an updated third MacroBlock; and form a new MacroBlock after sequentially arranging the data in the second MacroBlock other than the overlapping data and the data in the updated third MacroBlock, and store the new MacroBlock to the $(j+1)^{th}$ layer according to the order.

The detailed process of performing data processing by the data block storage apparatus in some embodiments has been described in detail in the above-described embodiments of the first aspect. Corresponding content in the embodiments of the first aspect may be referenced to for details, which will not be elaborated in the embodiments of the specification.

Figure 5:
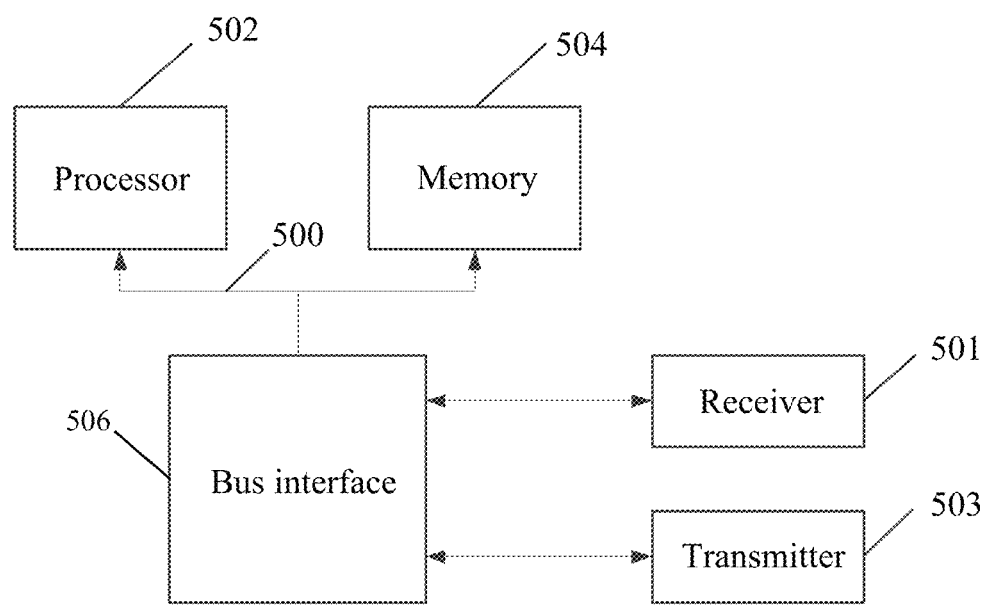
FIG. 5 is a block diagram of an electronic device according to some embodiments of the specification.

According to a third aspect, based on the same inventive concept as that of the data block storage method in the above-described embodiments, the specification further provides an electronic device, as shown in FIG. 5, comprising a memory 504, a processors 502, and a computer program stored on the memory 504 and capable of running on the processors 502. When executing the program, the processors 502 implements steps of any of the above-described data block storage methods.

In FIG. 5, there is a bus architecture (which is represented by a bus 500). The bus 500 may comprise any number of interconnected buses and bridges. The bus 500 may link together various circuits comprising one or more processors represented by the processor 502 and memories represented by the memory 504. The bus 500 may further link together various other circuits, such as peripheral devices, voltage stabilizers, power management circuits, and the like. All these are known in the art, which will not be further elaborated in the method in some embodiments. A bus interface 506 provides an interface between the bus 500 and a receiver 501 and a transmitter 503. The receiver 501 and the transmitter 503 may be the same element, i.e., a transceiver that provides a unit configured to communicate with various other devices on a transmission medium. The processor 502 is responsible for managing the bus 500 and regular processing, while the memory 504 may be configured to store data used by the processor 502 when executing operations.

According to a sixth aspect, based on the same inventive concept as that of the data block storage method in the above-described embodiments, the specification further provides a computer readable storage medium storing a computer program, wherein the program implements, when executed by a processor, steps of any of the above-described data block storage methods.

The specification is described with reference to flowcharts and/or block diagrams of the method, device (system), and computer program product according to the embodiments of the specification. It should be understood that a computer program instruction may be used to implement each process and/or block in the flowcharts and/or block diagrams and a combination of processes and/or blocks in the flowcharts and/or block diagrams. These computer program instructions may be provided for a general-purpose computer, a special-purpose computer, an embedded processor, or a processor of other programmable data processing devices to generate a machine, causing the instructions executed by a computer or a processor of other programmable data processing devices to generate an apparatus for implementing a function specified in one or more processes in the flowcharts and/or in one or more blocks in the block diagrams.

These computer program instructions may also be stored in a computer readable memory that can instruct a computer or other programmable data processing devices to work in a particular manner, causing the instructions stored in the computer readable memory to generate a manufactured article that includes an instruction apparatus. The instruction apparatus implements a function specified in one or more processes in the flowcharts and/or in one or more blocks in the block diagrams.

These computer program instructions may also be loaded onto a computer or other programmable data processing devices, causing a series of operational steps to be performed on the computer or other programmable devices, thereby generating computer-implemented processing. Therefore, the instructions executed on the computer or other programmable devices provide steps for implementing a function described in one or more processes in the flowcharts and/or in one or more blocks in the block diagrams.

Although preferred embodiments of the specification have been described, these embodiments may be amended or modified in other ways once one of ordinary skill in the art learns the basic innovative concepts. Therefore, the appended claims are intended to be interpreted as encompassing the preferred embodiments and all amendments and modifications that fall within the scope of the specification.

Apparently, one of ordinary skill in the art may make various modifications and variations to the specification without departing from the spirit and scope of the specification. In this way, if these modifications and variations to the specification fall within the scope of the claims of the specification and equivalent technologies thereof, then the specification also intends to encompass these modifications and variations.

The invention claimed is:

1. A data block storage method applied to a database employing a Log-Structured Merge (LSM) tree, wherein the LSM tree includes a data structure having N layers, and a storage space of an $i^{th}$ layer is less than a storage space of an $(i+1)^{th}$ layer, i being an integer from 0 to N−1, and the method comprising:

obtaining, by a processor, M pieces of ordered data from a memory according to a data sequence, M being an integer greater than 0;

compressing, by the processor, the M pieces of ordered data to obtain one MicroBlock;

iterating, by the processor, the obtaining and the compressing to generate a plurality of MicroBlocks;

sequentially writing, by the processor, the MicroBlocks to a current MacroBlock in the $0^{th}$ layer of the LSM tree until a size of the current MacroBlock reaches a preset value;

after the size of the current MacroBlock reaches the preset value, writing, by the processor, a next MicroBlock into a next MacroBlock until the $0^{th}$ layer is filled up with a plurality of MacroBlocks;

determining, by the processor, a to-be-merged $j^{th}$ layer in the LSM tree, j being an integer from 0 to N−1;

merging, by the processor, MacroBlocks in the $j^{th}$ layer to the $(j+1)^{th}$ layer, wherein the merging does not cause all MacroBlocks in the $(j+1)^{th}$ layer to be rewritten; and emptying, by the processor, the $j^{th}$ layer, the emptied $j^{th}$ layer being used for storing a MacroBlock transferred from the $(j-1)^{th}$ layer, wherein the merging, by the processor, MacroBlocks in the $j^{th}$ layer to the $(j+1)^{th}$ layer comprises:

determining, by the processor, whether a first MacroBlock in the $j^{th}$ layer and MacroBlocks in the $(j+1)^{th}$ layer have one or more identical keys;

in response to determining that the first MacroBlock in the $j^{th}$ layer and the MacroBlocks in the $(j+1)^{th}$ layer have no identical key, directly transferring, by the processor, the first MacroBlock to the $(j+1)^{th}$ layer;

in response to determining that the first MacroBlock in the $j^{th}$ layer and a second MacroBlock in the $(j+1)^{th}$ layer have one or more identical keys, reading, by the processor, all of one or more key-value pairs of the first MacroBlock and all of one or more key-value pairs of the second MacroBlock;

updating, by the processor, one or more values corresponding to the one or more identical keys in the second MacroBlock to be one or more values corresponding to the one or more identical keys in the first MacroBlock to obtain an updated second MacroBlock;

generating, by the processor, a new MacroBlock by sequentially arranging key-value pairs in the first MacroBlock other than key-value pairs corresponding to the one or more identical keys and key-value pairs in the updated second MacroBlock; and storing, by the processor, the new MacroBlock to the $(j+1)^{th}$ layer.

2. The data block storage method according to claim 1, wherein the determining, by the processor, a to-be-merged $j^{th}$ layer in the LSM tree comprises:

determining, by the processor, a layer in the LSM tree with a remaining storage space insufficient of storing to-be-stored data as the $j^{th}$ layer.

3. The data block storage method according to claim 2, wherein the to-be-stored data is a to-be-written MicroBlock received at the $0^{th}$ layer, and the method further comprises: if the remaining storage space of the $0^{th}$ layer is less than a size of one MacroBlock, determining, by the processor, that the $0^{th}$ layer is unable to store the to-be-written MicroBlock.

4. The data block storage method according to claim 2, wherein the to-be-stored data is a MacroBlock from a layer immediately above the $j^{th}$ layer in the LSM tree.

5. The data block storage method according to claim 1, wherein the determining a to-be-merged $j^{th}$ layer in the LSM tree comprises:

determining a layer in the LSM tree with a remaining storage space less than a preset capacity as the $j^{th}$ layer.

6. The data block storage method according to claim 1, wherein a size of each MacroBlock stored in the N layers of the LSM tree is a preset fixed value.

7. An apparatus, comprising:
one or more processors; and
a memory storing instructions executable by the one or more processors to cause the one or more processors to perform operations comprising:
obtaining M pieces of ordered data from a memory according to a data sequence, M being an integer greater than 0;
compressing the M pieces of ordered data to obtain one MicroBlock;
iterating the obtaining and the compressing to generate a plurality of MicroBlocks;
sequentially writing the MicroBlocks to a current MacroBlock in the $0^{th}$ layer of a Log-Structured Merge (LSM) tree until a size of the current MacroBlock reaches a preset value, wherein the LSM tree includes a data structure having N layers, and a storage space of an $i^{th}$ layer is less than a storage space of an $(i+1)^{th}$ layer, i being an integer from 0 to N−1;
after the size of the current MacroBlock reaches the preset value, writing a next MicroBlock into a next MacroBlock until the $0^{th}$ layer is filled up with a plurality of MacroBlocks;
determining a to-be-merged $j^{th}$ layer in the LSM tree, j being an integer from 0 to N−1;

merging MacroBlocks in the $j^{th}$ layer to the $(j+1)^{th}$ layer, wherein the merging does not cause all MacroBlocks in the $(j+1)^{th}$ layer to be rewritten; and emptying the $j^{th}$ layer, the emptied $j^{th}$ layer being used for storing a MacroBlock transferred from the $(j-1)^{th}$ layer, wherein the merging MacroBlocks in the $j^{th}$ layer to the $(j+1)^{th}$ layer comprises:

determining whether a first MacroBlock in the $j^{th}$ layer and MacroBlocks in the $(j+1)$ layer have one or more identical keys;

in response to determining that the first MacroBlock in the $j^{th}$ layer and the MacroBlocks in the $(j+1)^{th}$ layer have no identical key, directly transferring the first MacroBlock to the $(j+1)^{th}$ layer;

in response to determining that the first MacroBlock in the $j^{th}$ layer and a second MacroBlock in the $(j+1)^{th}$ layer have one or more identical keys, reading all of one or more key-value pairs of the first MacroBlock and all of one or more key-value pairs of the second MacroBlock;

updating one or more values corresponding to the one or more identical keys in the second MacroBlock to be one or more values corresponding to the one or more identical keys in the first MacroBlock to obtain an updated second MacroBlock;

generating a new MacroBlock by sequentially arranging key-value pairs in the first MacroBlock other than key-value pairs corresponding to the one or more identical keys and key-value pairs in the updated second MacroBlock; and storing the new MacroBlock to the $(j+1)^{th}$ layer.

8. The apparatus according to claim 7, wherein the determining a to-be-merged $j^{th}$ layer in the LSM tree comprises:

determining a layer in the LSM tree with a remaining storage space insufficient of storing to-be-stored data as the $j^{th}$ layer.

9. The apparatus according to claim 8, wherein the to-be-stored data is a to-be-written MicroBlock received at the $0^{th}$ layer, and the operations further comprise: if the remaining storage space of the $0^{th}$ layer is less than a size of one MacroBlock, determining that the $0^{th}$ layer is unable to store the to-be-written MicroBlock.

10. The apparatus according to claim 8, wherein the to-be-stored data is a MacroBlock from a layer immediately above the $j^{th}$ layer in the LSM tree.

11. The apparatus according to claim 7, wherein the determining a to-be-merged $j^{th}$ layer in the LSM tree comprises:

determining a layer in the LSM tree with a remaining storage space less than a preset capacity as the $j^{th}$ layer.

12. The apparatus according to claim 7, wherein a size of each MacroBlock stored in the N layers of the LSM tree is a preset fixed value.

13. One or more non-transitory computer-readable storage media configured with instructions executable by one or more processors to cause the one or more processors to perform operations comprising:

obtaining M pieces of ordered data from a memory according to a data sequence, M being an integer greater than 0;

compressing the M pieces of ordered data to obtain one MicroBlock;

iterating the obtaining and the compressing to generate a plurality of MicroBlocks;

sequentially writing the MicroBlocks to a current MacroBlock in the $0^{th}$ layer of a Log-Structured Merge (LSM) tree until a size of the current MacroBlock reaches a preset value, wherein the LSM tree includes a data structure having N layers, and a storage space of an $i^{th}$ layer is less than a storage space of an $(i+1)^{th}$ layer, i being an integer from 0 to N−1;

after the size of the current MacroBlock reaches the preset value, writing a next MicroBlock into a next MacroBlock until the $0^{th}$ layer is filled up with a plurality of MacroBlocks;

determining a to-be-merged $j^{th}$ layer in the LSM tree, j being an integer from 0 to N−1;

merging MacroBlocks in the $j^{th}$ layer to the $(j+1)^{th}$ layer, wherein the merging does not cause all MacroBlocks in the $(j+1)^{th}$ layer to be rewritten; and emptying the $j^{th}$ layer, the emptied $j^{th}$ layer being used for storing a MacroBlock transferred from the $(j−1)^{th}$ layer, wherein the merging MacroBlocks in the $j^{th}$ layer to the $(j+1)^{th}$ layer comprises:

determining whether a first MacroBlock in the $j^{th}$ layer and MacroBlocks in the $(j+1)^{th}$ layer have one or more identical keys;

in response to determining that the first MacroBlock in the $j^{th}$ layer and the MacroBlocks in the $(j+1)^{th}$ layer have no identical key, directly transferring the first MacroBlock to the $(j+1)^{th}$ layer;

in response to determining that the first MacroBlock in the $j^{th}$ layer and a second MacroBlock in the $(j+1)^{th}$ layer have one or more identical keys, reading all of one or more key-value pairs of the first MacroBlock and all of one or more key-value pairs of the second MacroBlock;

updating one or more values corresponding to the one or more identical keys in the second MacroBlock to be one or more values corresponding to the one or more identical keys in the first MacroBlock to obtain an updated second MacroBlock;

generating a new MacroBlock by sequentially arranging key-value pairs in the first MacroBlock other than key-value pairs corresponding to the one or more identical keys and key-value pairs in the updated second MacroBlock; and storing the new MacroBlock to the $(j+1)^{th}$ layer.

14. The one or more non-transitory computer-readable storage media according to claim 13, wherein the determining a to-be-merged $j^{th}$ layer in the LSM tree comprises:

determining a layer in the LSM tree with a remaining storage space insufficient of storing to-be-stored data as the $j^{th}$ layer.

15. The one or more non-transitory computer-readable storage media according to claim 14, wherein the to-be-stored data is a to-be-written MicroBlock received at the $0^{th}$ layer, and the operations further comprise: if the remaining storage space of the $0^{th}$ layer is less than a size of one MacroBlock, determining that the $0^{th}$ layer is unable to store the to-be-written MicroBlock.

16. The one or more non-transitory computer-readable storage media according to claim 14, wherein the to-be-stored data is a MacroBlock from a layer immediately above the $j^{th}$ layer in the LSM tree.

17. The one or more non-transitory computer-readable storage media according to claim 13, wherein the determining a to-be-merged $j^{th}$ layer in the LSM tree comprises:

determining a layer in the LSM tree with a remaining storage space less than a preset capacity as the $j^{th}$ layer.

* * * * *

UNITED STATES PATENT AND TRADEMARK OFFICE
CERTIFICATE OF CORRECTION

PATENT NO. : 10,983,975 B2
APPLICATION NO. : 16/884497
DATED : April 20, 2021
INVENTOR(S) : Zhenkun Yang et al.

Page 1 of 1

It is certified that error appears in the above-identified patent and that said Letters Patent is hereby corrected as shown below:

In the Claims
Claim 7, Column 14, Line 9:
"in the (j+1) layer" should read -- in the $(j+1)^{th}$ layer --.

Signed and Sealed this
Nineteenth Day of October, 2021

Drew Hirshfeld
*Performing the Functions and Duties of the
Under Secretary of Commerce for Intellectual Property and
Director of the United States Patent and Trademark Office*